(12) United States Patent
Kuhm et al.

(10) Patent No.: US 9,347,480 B2
(45) Date of Patent: May 24, 2016

(54) NUT AND VEHICLE PART COMPRISING SUCH A NUT

(75) Inventors: Michel Kuhm, Ingwiller (FR);
 Dominique Duchet, Cauvigny (FR);
 Frédéric Lard, Saint Martin le Noeud (FR)

(73) Assignee: Faurecia Interieur Industrie, Nanterre (FR)

( * ) Notice: Subject to any disclaimer, the term of this patent is extended or adjusted under 35 U.S.C. 154(b) by 162 days.

(21) Appl. No.: 13/557,852

(22) Filed: Jul. 25, 2012

(65) Prior Publication Data
 US 2013/0026788 A1  Jan. 31, 2013

(30) Foreign Application Priority Data

Jul. 25, 2011 (FR) ...................... 11 56776

(51) Int. Cl.
 *F16B 39/00* (2006.01)
 *F16B 37/04* (2006.01)
 *F16B 37/00* (2006.01)

(52) U.S. Cl.
 CPC ............. *F16B 37/043* (2013.01); *F16B 37/005* (2013.01)

(58) Field of Classification Search
 CPC .... F16B 37/041; F16B 37/043; F16B 37/044; F16B 2/065; F16B 5/0635; F16B 37/02; F16B 37/04; F16B 37/046; F16B 37/005; F16B 39/00; B25B 23/08
 USPC .................. 411/174, 175, 112, 170
 See application file for complete search history.

(56) References Cited

U.S. PATENT DOCUMENTS

| | | | |
|---|---|---|---|
| 3,999,583 A | 12/1976 | Nelson | |
| 4,074,491 A | 2/1978 | Bell et al. | |
| 4,955,772 A | 9/1990 | Reck | |
| 7,654,783 B2 * | 2/2010 | Giraud | ........................ 411/174 |
| 2006/0072981 A1 | 4/2006 | Bros et al. | |

FOREIGN PATENT DOCUMENTS

| | | | |
|---|---|---|---|
| DE | 10 2009 024 531 A1 | * | 12/2010 |
| FR | 1 527 611 | * | 5/1968 |
| FR | 1527611 | | 5/1968 |
| FR | 2492015 | | 4/1982 |
| FR | 2518195 | | 6/1983 |
| FR | 2842877 | | 1/2004 |
| WO | WO2004/083657 | | 9/2004 |

OTHER PUBLICATIONS

French Search Report for application No. FR 1156776, dated Nov. 14, 2011, 2 pages.
Opinion for application No. FR 1156776, dated Nov. 14, 2011, 3 pages.

* cited by examiner

*Primary Examiner* — Roberta Delisle
(74) *Attorney, Agent, or Firm* — Reising Ethington P.C.

(57) ABSTRACT

A nut in the form of a mounting element made in a single piece and having a first branch and a second branch connected by a web, the first branch and the second branch each including a proximal portion connected to the web and a distal portion extending the proximal portion. The nut includes a screwing element supported by the distal portion of the first branch, with a bore extending inside the screwing element along a screwing axis and emerging inside the mounting element through the distal portion of the first branch. The second branch includes an opening passing through the distal portion of the second branch opposite the bore. The proximal portion of at least one of the first and second branches is deformable so as to allow the distal portions of the first branch and the second branch to be positioned parallel to one another with different spacings.

19 Claims, 4 Drawing Sheets

NUT AND VEHICLE PART COMPRISING SUCH A NUT

TECHNICAL FIELD

The present invention relates to a nut used to attach a vehicle panel or other such part to another part of the vehicle.

BACKGROUND

A nut of the type contemplated herein is a mounting element that includes a screwing element having a bore. The nut can be mounted on the edge of a panel having an opening by positioning the mounting element overlapping the edge of the panel and the screwing element opposite the opening in order to screw a fastening screw through the panel through the opening of the bore. Such a nut is disclosed in U.S. Pat. No. 4,955,772.

In the motor vehicle field, such a nut is for example used to fasten inner trim elements, such as dashboards. Trim elements designed for a same vehicle model may have different thicknesses depending on the finish. To take this into account, it is possible to provide a plurality of nut models, each nut model being adapted to panels having a specific thickness.

Nevertheless, this requires that several nut models be manufactured, and the different nut models and the stock thereof must be monitored during the manufacture of trim elements, which is expensive.

SUMMARY

One aim of the invention is to propose a fastening solution adapted to panels having different thicknesses.

To that end and in accordance with an embodiment of the invention, there is provided a nut in the form of a mounting element made in a single piece, in the shape of a U and having a first branch and a second branch connected by a web, the first branch and the second branch each including a proximal portion connected to the web and a distal portion extending the proximal portion. The nut includes a screwing element supported by the distal portion of the first branch, with a bore extending inside the screwing element along a screwing axis and emerging inside the mounting element through the distal portion of the first branch. The second branch includes an opening passing through the distal portion of the second branch opposite the bore. The proximal portion of at least one of the first and second branches is deformable so as to allow the distal portions of the first branch and the second branch to be positioned parallel to one another with different spacings.

According to other embodiments, the nut comprises one or more of the following features, considered alone or according to all technically possible combinations:
  said deformable proximal portion belongs to the first branch;
  in the free state of the mounting element, the deformable proximal portion is inclined relative to the adjacent distal portion and relative to the web;
  at least in the free state of the mounting element, the deformable proximal portion defines an acute angle with the web;
  at least in the free state of the mounting element, the deformable proximal portion defines an obtuse angle with the adjacent distal portion, in particular a reentrant angle;
  the deformable proximal portion comprises a curved segment connecting the deformable proximal portion to the adjacent distal portion;
  the deformable proximal portion comprises a curved segment connecting the deformable proximal portion to the web;
  at least in the free state of the mounting element, the deformable proximal portion has a curved profile with at least one concavity turned toward the inside and/or at least one concavity turned toward the outside;
  in the mounted state of the mounting element, the web is substantially perpendicular to the first and second branches;
  in the state mounted on a panel having a maximal thickness, the deformable proximal portion is substantially rectilinear and aligned with the adjacent distal portion;
  a tubular extension protruded toward the inside of the mounting element along the screwing axis from the first branch, the bore passing through the extension, the extension comprising at least one cylindrical segment with a constant transverse section.

The invention also relates to a vehicle part comprising a panel having an edge and a hole passing through the panel, and a nut mounted on the edge of the panel such that the mounting element overlaps the edge and the screwing element is across from the hole.

BRIEF DESCRIPTION OF THE DRAWINGS

The invention and the advantages thereof will be better understood upon reading the following description, provided solely as an example, and done in reference to the appended drawings, in which.

DETAILED DESCRIPTION OF THE ILLUSTRATED EMBODIMENT(S)

Figure 1:
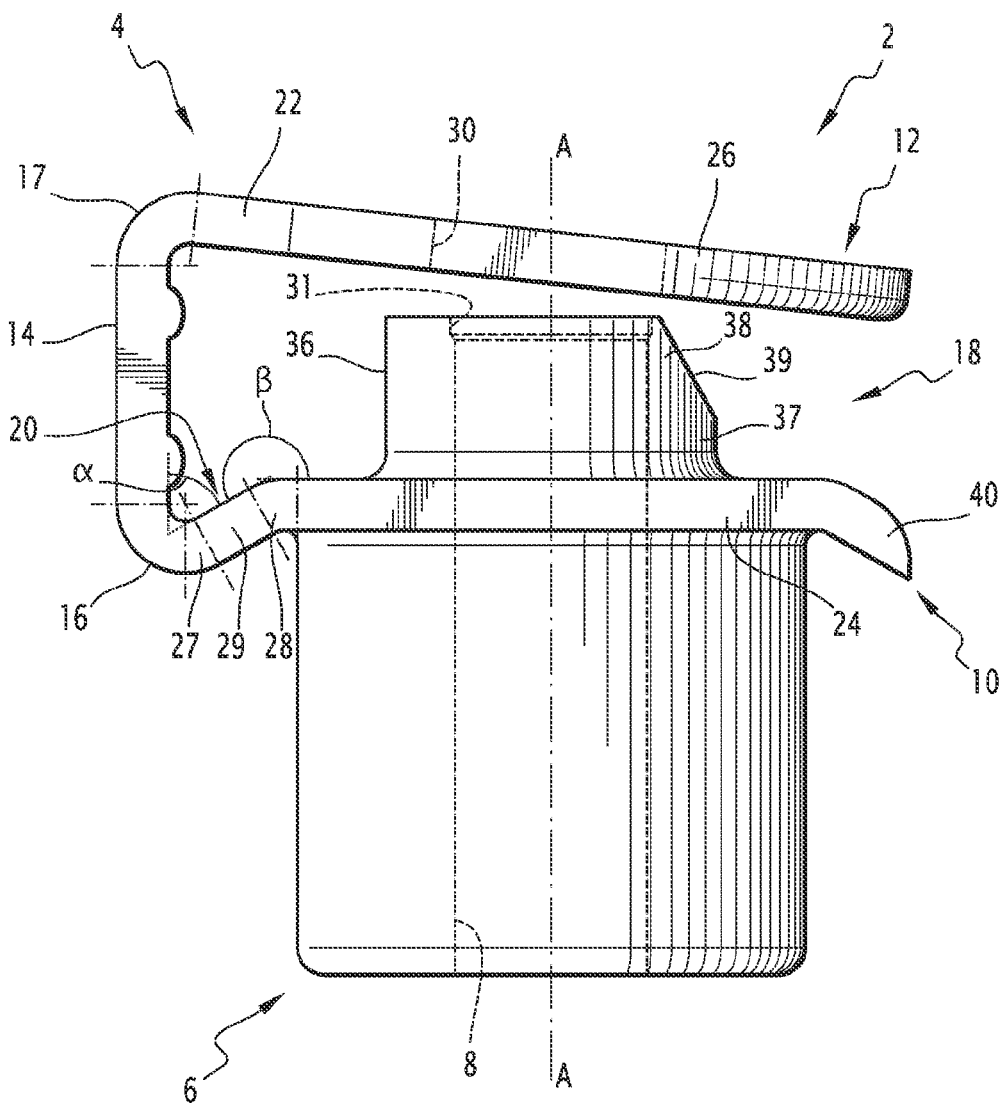
FIG. 1 is an elevation side view of a nut according to the invention.
Figure 2:
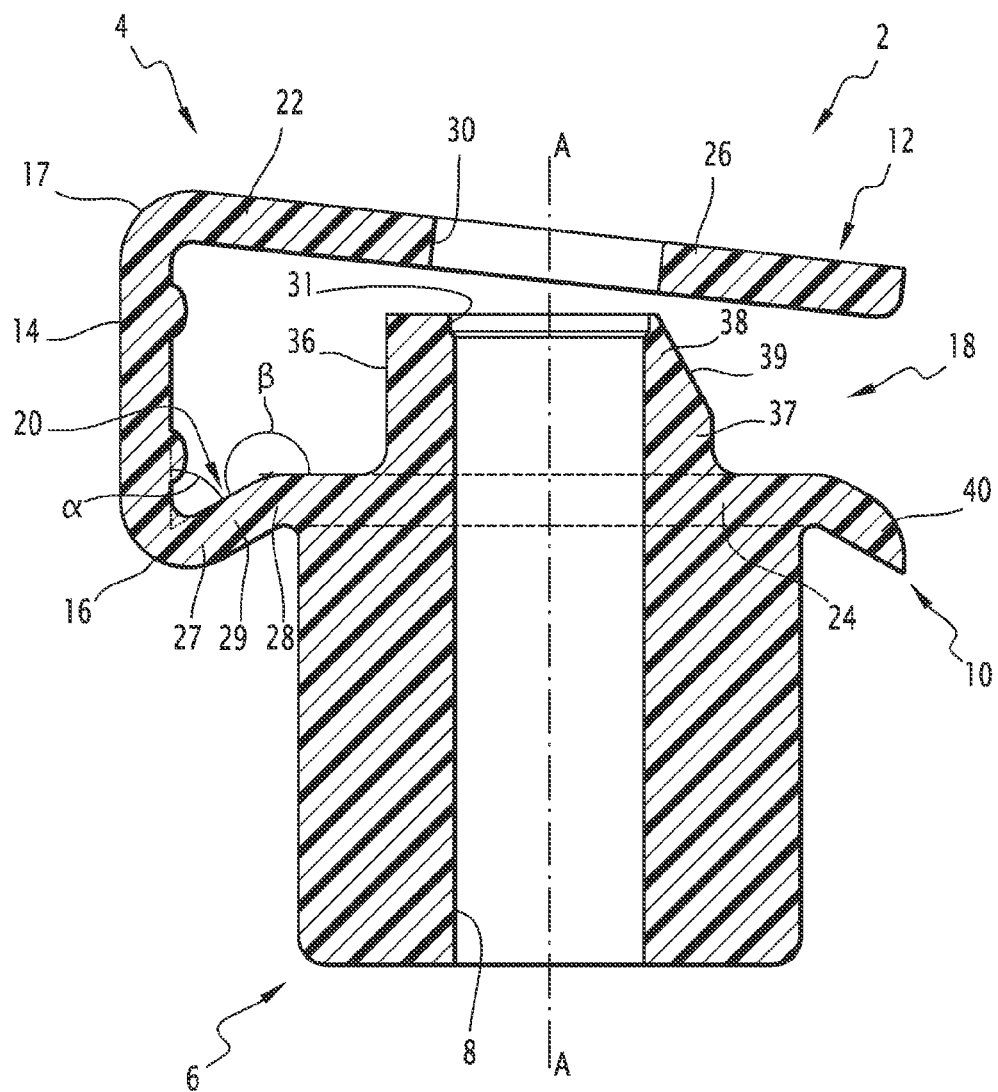
FIG. 2 is a cross-sectional side view of the nut of FIG. 1.

As illustrated in FIGS. 1 and 2, the nut 2 comprises a mounting element 4 for mounting the nut overlapping on the edge of a panel, and a screwing element 6 for screwing a screw inside a bore 8 of the screwing element 6, extending along a screwing axis A-A.

The mounting element 4 is made in a single piece, preferably from molded plastic, in particular by injection.

The mounting element 4 is in the shape of a U and has a first branch 10 and a second branch 12 facing one another, connected by a web 14, giving the mounting element 4 its U shape.

Hereafter, in relation to the mounting element 4, the term "inner" will refer to the area situated between the two branches 10, 12 of the mounting element 4, and "outer" will refer to the area situated outside the two branches 10, 12 of the mounting element 4.

The first branch 10 is connected to the web 14 by a first bend 16 and the second branch 12 is connected to the web 14 by a second bend 17. The first bend 16 and the second bend 17 are curved with their concavity turned toward the inside of the mounting element 4.

The first branch 10 and the second branch 12 each have an inner surface turned toward the inside of the mounting element 4 and an outer surface turned toward the outside of the mounting element 4.

The first branch 10 and the second branch 12 each have a proximal end adjacent to the web 14 and a free, distal end opposite the web 14.

The first branch 10 and the second branch 12 define an inner space between them closed on one side by the web 14 and opened on the opposite side by an opening 18 defined between the distal ends of the branches 10, 12.

The web 14 has a rectilinear profile and extends substantially parallel to the screwing axis A-A.

The first branch 10 and the second branch 12 each comprise a proximal portion 20, 22, respectively, extending from the corresponding connecting bend 16, 17, and an adjacent distal portion 24, 26, respectively, extending the proximal portion 20, 22, respectively.

The distal portion 24 of the first branch 10 has a rectilinear profile and is substantially perpendicular to the screwing axis A-A.

In the free state of the mounting element 4 (FIGS. 1 and 2), the proximal portion 20 of the first branch 10 has a curved profile. The proximal portion 20 of the first branch 10 here has a profile with two curves in the general shape of an S.

The proximal portion 20 comprises a first curved segment 27 with the concavity thereof turned toward the inside of the mounting element 4, connecting the proximal portion 20 to the first bend 16, and a second curved segment 28 with the concavity turned toward the outside, connecting the proximal portion 20 to the corresponding distal portion 24.

The proximal portion 20 comes back toward the inside of the mounting element 4 from the first corresponding bend 16. The distal portion 24 of the first branch 10 is offset toward the inside of the mounting element 4 along the screwing axis A-A relative to the first bend 16.

Between the first segment 27 and the second segment 28, the proximal portion 20 is inclined relative to the distal portion 24 of the first branch 10. The proximal portion defines an acute angle a with the web 14, inside the mounting element 4. The proximal portion 20 defines an obtuse angle β, here a reentrant angle, greater than 180°, with the adjacent distal portion 24 of the first branch 10, inside the mounting element 4.

In the illustrated example, between the first segment 27 and the second segment 28, the proximal portion 20 comprises an intermediate segment 29 with a rectilinear profile. Alternatively, the proximal portion 20 does not have an intermediate segment with a rectilinear profile and comprises an inflection area in which the curve of the proximal portion 20 reverses.

The proximal portion 20 has a substantially constant thickness from the web 14 to the distal portion 24. The proximal portion 20 has a substantially constant thickness from the first segment 27 to the second segment 28 thereof.

The second branch 12 has a rectilinear profile.

In the free state of the mounting element 4, the second branch 12 is inclined relative to a plane perpendicular to the screwing axis A-A. The distal portions 24, 26 of the first branch 10 and the second branch 12 are inclined relative to one another and converge toward the opening 18.

The screwing element 6 is supported by the distal portion 24 of the first branch 10, on the outer surface of the first branch 10 facing the outside of the mounting element 4.

The screwing element 6 extends from the distal portion 24 of the first branch 10 along the screwing axis A-A perpendicular to the distal portion 24 of the first branch 10, toward the outside of the mounting element 4. The screwing element 6 assumes the form of a tubular barrel.

The screwing element 6 is preferably made in a single piece with the mounting element 4. Alternatively, the screwing element 6 is separate from the mounting element 4 and attached thereon.

The bore 8 extends inside the screwing element 6 along the screwing axis A-A. The bore 8 emerges inside the mounting element 4 through the distal portion 24 of the first branch 10. The bore 8 emerges at the end of the screwing element 6 opposite the first branch 10. Alternatively, the bore 8 is blind and emerges only inside the mounting element 4.

The bore 8 is smooth. The bore 8 allows the screwing of a screw, such that the outer thread of the screw hollows out an inner thread in the bore 8 during the first screwing. Alternatively, the bore 8 is tapped.

The second branch 12 comprises an opening 30 passing through the distal portion 26 of the second branch 12 across from the bore 8. The opening 30 can allow the passage of the screw through the second branch 12 in order to screw the screw into the bore 8.

As illustrated, the opening 30 has a diameter larger than that of the bore 8.

This makes it possible to insert a screw freely through the second branch 12. Alternatively, the opening 30 has the same diameter as the bore 8.

The bore 8 comprises a counterbore 31 at the end thereof adjacent to the second branch 12 to facilitate the centering and insertion of a screw.

The mounting element 4 comprises a tubular extension 36, or shaft, supported by the first branch 10 on the inner surface thereof across from the screwing element 6.

The extension 36 protrudes from the first branch 10 along the screwing axis A-A toward the second branch 12. The bore 8 extends in the extension 36 and passes through it.

The extension 36 comprises a cylindrical segment 37 extending from the first branch 10. The bore 8 passes through the cylindrical segment 37 over the entire height thereof. The cylindrical segment 37 has a constant transverse section and a side wall with a constant thickness over the length of the cylindrical segment 37 and sufficient to allow the thread of a screw to engage in said cylindrical segment.

The extension 36 comprises an end segment 38 extending the cylindrical segment 37 toward the second branch 12. The counterbore 31 is formed in the free end of the end segment 38 adjacent to the second branch 12.

The extension 36 has a side surface 39 inclined relative to the screwing axis A-A, turned toward the opening 18 and the second branch 12. The side surface 39 is formed on the end segment 38, the side wall of which has a thickness decreasing toward the free end in the area of the side wall supporting the inclined side surface 39.

Alternatively or optionally, the mounting element 4 comprises a tubular extension supported by the second branch 12, on the inner surface thereof, the opening 30 then passing through the extension.

The first branch 10 has a curved nose 40 extending the distal portion 24 of the first branch 10 well-being curved toward the outside of the mounting element 4.

Figure 3:
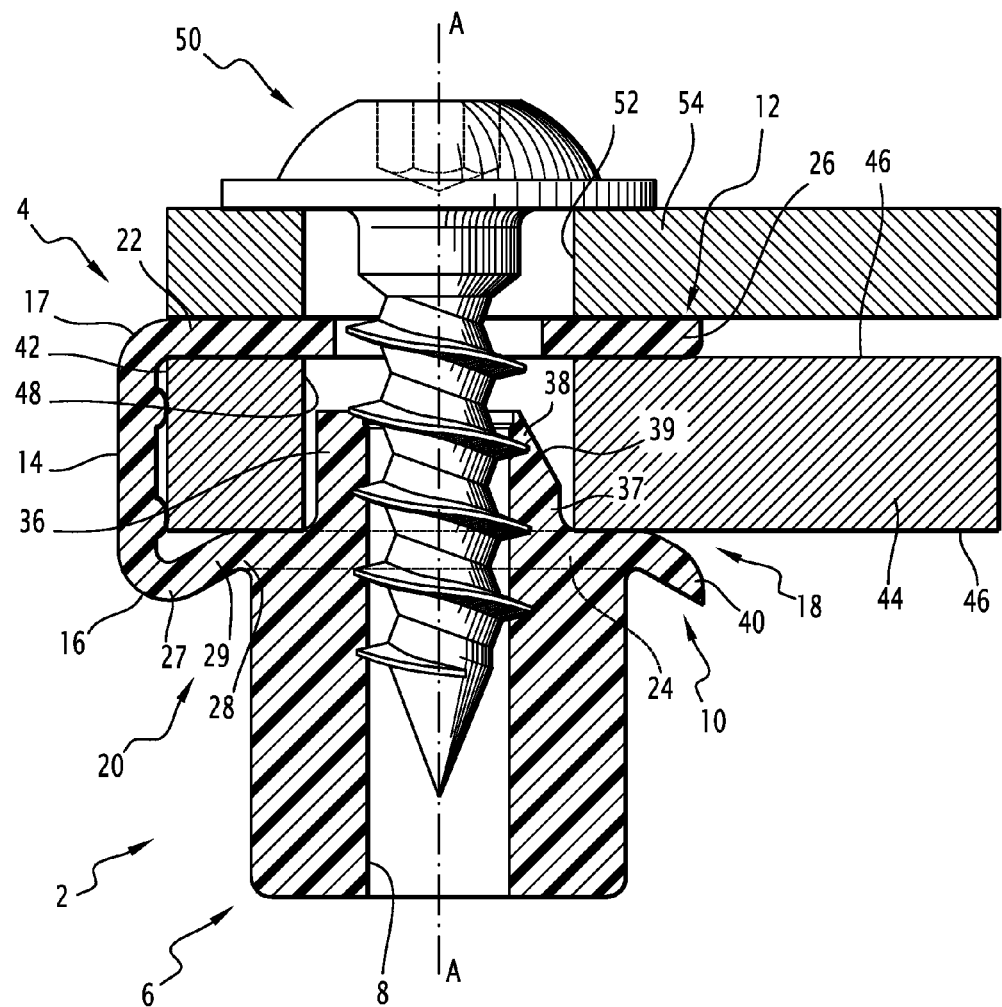
FIG. 3 is a cross-sectional view of the nut of FIG. 1 in a first assembly configuration.

As illustrated in FIG. 3, the nut 2 is mounted overlapping on the edge 42 of the panel 44 having two parallel opposite surfaces 46, and a hole 48 passing through the panel 44, adjacent to the edge 42.

The mounting element 4 is mounted overlapping on the edge 42, the panel 44 being received between the first branch 10 and the second branch 12, the latter bearing by their distal portions 24, 26 on the opposite surfaces 46 of the panel 44. The extension 36 is engaged in the hole 48.

For mounting, the nut 2 was forcibly engaged on the edge 42 of the panel 44 by inserting the edge 42 through the opening 18. The branches 10, 12 spread apart, until the extension 36 is engaged inside the opening 48 and the distal portions 24, 26 of the branches 10, 12 are pressed against the surfaces 46 of the panel 44 by elastic return. The nut 2 was then snapped on the panel 44.

The nose 40 and the inclined side surface 39 of the extension 36 facilitate mounting of the nut 2 on the edge 42 of the panel 44.

Next, a screw 50 is engaged through the opening 30 of the second branch 12 and screwed into the bore 8.

As illustrated in FIG. 3, the screw 50 passes through a hole 52 of a plate 54 gripped between the head of the screw 50 and the second branch 12 of the nut 2, to fasten the plate 54 on the panel 44.

The mounting element 4 allows the mounting element 4 to be mounted overlapping on the edge of panels having different thicknesses.

The proximal portion 20 of the first branch 10 can be deformed so as to make it possible, from the free state of the mounting element 4, to space the distal portions 24, 26 apart and to position them parallel to one another and with different spacings, to offset thickness variations from one panel to the next.

Figure 4:
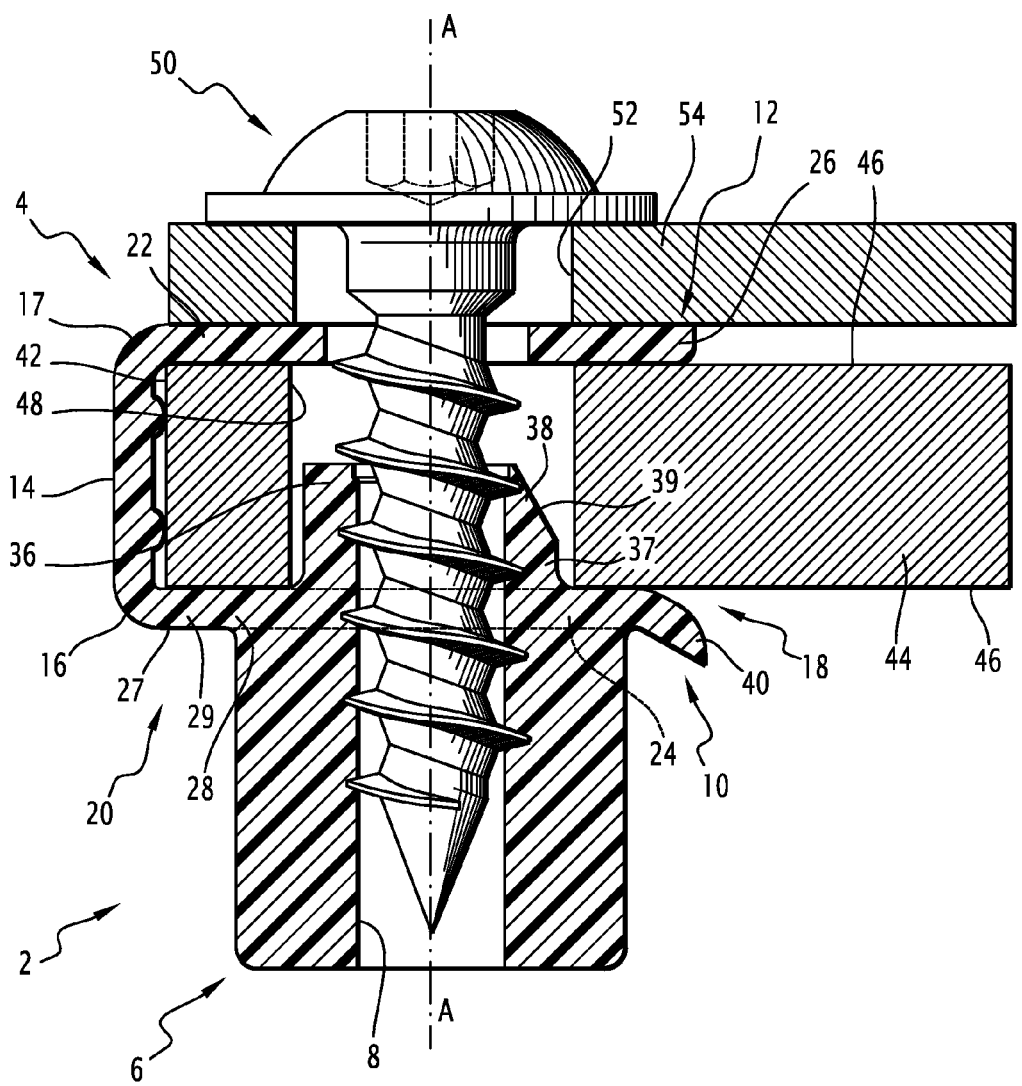
FIG. 4 is a cross-sectional view of the nut of FIG. 1 in a second assembly configuration.

FIG. 4 illustrates an assembly similar to that of FIG. 3, in which the panel 44 is a panel with a maximum thickness having a thickness corresponding to the maximum thickness accepted by the nut 2, larger than that of the panel of FIG. 3.

When the nut 2 is mounted on the panel 44, the proximal portion 20 of the first branch 10 is deformed so as to offset the thickness increase.

The proximal portion 20 unfolds so as to allow the adjacent distal portion 24 to move relative to the web 14, while allowing the distal portions 24, 26 to remain parallel to one another. The web 14 remains substantially parallel to the screwing axis A-A.

As illustrated in FIG. 4, in the state mounted on a panel 44 with a maximum thickness, the proximal portion 20 is substantially rectilinear and aligned with the adjacent distal portion 24.

The proximal portion 20 of the first branch 10 forms a reserve extension allowing a movement along the screwing axis A-A of the distal portion 24 relative to the web 14.

The possibility of movement is obtained without significant thinning and without local weakening of the mounting element 4 and the first branch 10, which makes it possible to obtain a strong nut 2.

The extension 36 having a cylindrical segment 37 with a constant section in which the bore 8 extends makes it possible to increase the useful axial length of the bore 8 on which the screw can engage, which improves the effectiveness of the nut 2.

The web 12 remaining parallel to screw axis A-A reliably locates the mounting element 4 on the edges of plates with different thicknesses.

The nut 2 is obtained easily and inexpensively in a single piece, for example by molding plastic, in particular by injection molding. The nut 2 can be mounted on the panel 2 without a risk of unintentional disassembly, for later screwing of the panel on another element.

In the illustrated example, only the first branch 10 is provided with a deformable proximal portion 20. Optionally or alternatively, the second branch 12 comprises a deformable proximal portion, similar to that of the first branch 10 illustrated in FIGS. 1 to 4.

The invention applies to the fastening of motor vehicle panels, in particular the fastening of an inner trim panel, for example the fastening of a dashboard trim panel.

The invention claimed is:

1. A nut comprising a mounting element made in a single piece, in the shape of a U and comprising a first branch and a second branch connected by a web, the web having a rectilinear profile and extending substantially parallel to a screwing axis, the first branch being connected to the web by a first bend and the second branch being connected to the web by a second bend, the first branch comprising a proximal portion extending from the first bend and an adjacent distal portion extending from the proximal portion thereof, the second branch comprising a proximal portion extending from the second bend and an adjacent distal portion extending from the proximal portion thereof, a screwing element supported by the distal portion of the first branch, a bore extending inside the screwing element along the screwing axis and emerging inside the mounting element through the distal portion of the first branch and an opening passing through the distal portion of the second branch opposite the bore, wherein, in the free state of the mounting element, the distal portion of the second branch has a rectilinear profile and is inclined relative to the distal portion of the first branch, wherein the proximal portion of the first branch of the mounting element forms a reserve extension adapted to be deformed in use, allowing movement of the distal portions of the first and second branches along the screwing axis relative to each other and into a parallel position relative to each other at any of a plurality of different spacings therebetween, and wherein the web is substantially perpendicular to the distal portions of the first and second branches when the branches are at any one of the plurality of different spacings.

2. A nut according to claim 1, wherein, in the free state of the mounting element, the proximal portion of the first branch has a profile comprising a first curved segment, a second curved segment, and an intermediate segment extending between the first and second curved segments, with the first curved segment connecting the proximal portion of the first branch to the first bend and the second curved segment connecting the proximal portion of the first branch to the distal portion of the first branch.

3. A nut according to claim 2, wherein, in the free state of the mounting element, the intermediate segment of the proximal portion of the first branch is inclined relative to the distal portion of the first branch and relative to the web.

4. A nut according to claim 2, wherein, at least in the free state of the mounting element, the intermediate segment of the proximal portion of the first branch defines an acute angle with the web.

5. A nut according to claim 2, wherein at least in the free state of the mounting element, the intermediate segment of the proximal portion of the first branch defines an obtuse angle with the distal portion of the first branch.

6. A nut according to claim 2, wherein the intermediate segment of the proximal portion of the first branch has a rectilinear profile.

7. A nut according to, claim 2, wherein the intermediate segment of the proximal portion of the first branch comprises an inflection area in which a curve of the proximal portion of the first branch reverses.

8. A nut according to claim 2, wherein, at least in the free state of the mounting element, the first curved segment of the proximal portion of the first branch has a concavity that faces toward the inside of the mounting element and the second curved segment of the proximal portion of the first branch has a concavity that faces away from the inside of the mounting element.

9. A nut according to claim 1, wherein, in the state mounted on a panel having a maximal thickness, the proximal portion of the first branch of the mounting element is substantially rectilinear and aligned with the adjacent distal portion of the first branch.

10. A nut according to claim 1, comprising a tubular extension protruded along the screwing axis from the first branch toward the second branch, the bore passing through the extension, the extension comprising at least one cylindrical segment with a constant transverse section.

11. The nut according to claim 1, wherein, when the proximal portion of the first branch of the mounting element is deformed such that the distal portion of the first branch moves along the screwing axis relative to the web, the mounting element is configured such that the web remains substantially parallel to the screwing axis.

12. A nut according to claim 1, wherein the proximal portion of the first branch of the mounting element is of substantially constant thickness between the web and the adjacent distal portion of the first branch.

13. A vehicle part comprising a panel having an edge and a hole passing through the panel, and a nut according to claim 1 mounted on the edge of the panel such that the mounting element overlaps the edge and the screwing element is across from the hole.

14. A nut according to claim 1, wherein at least in the free state of the mounting element, the proximal portion of the first branch of the mounting element defines a reentrant angle with the adjacent distal portion of the first branch.

15. A nut according to claim 1, wherein, in the free state of the mounting element, the web is parallel to the screwing axis and perpendicular to the distal portion of the first branch.

16. A nut according to claim 1, wherein, in the free state of the mounting element, the distal portion of the first branch is offset toward the inside of the mounting element along the screwing axis relative to the first bend.

17. A nut according to claim 1, wherein the screwing element extends from the first branch along the screwing axis toward the outside of the mounting element.

18. A nut comprising a mounting element made in a single piece, in the shape of a U and comprising a first branch and a second branch connected by a web, the web having a rectilinear profile and extending substantially parallel to a screwing axis, the first branch being connected to the web by a first bend and the second branch being connected to the web by a second bend, the first branch comprising a proximal portion extending from the first bend and an adjacent distal portion extending from the proximal portion thereof, the second branch comprising a proximal portion extending from the second bend and an adjacent distal portion extending from the proximal portion thereof, a screwing element supported by the distal portion of the first branch, a bore extending inside the screwing element along the screwing axis and emerging inside the mounting element through the distal portion of the first branch and an opening passing through the distal portion of the second branch opposite the bore,
- wherein, in the free state of the mounting element, the distal portion of the second branch has a rectilinear profile and is inclined relative to the distal portion of the first branch,
- wherein the web remains substantially parallel to the screwing axis when installed on one or more plates, and
- wherein the proximal portion of the first branch of the mounting element forms a reserve extension adapted to be deformed in use, allowing movement of the distal portions of the first and second branches along the screwing axis relative to each other and into a parallel position relative to each other at any of a plurality of different spacings therebetween.

19. A vehicle part comprising:
a panel having an edge;
a hole passing through the panel; and
a nut comprising a mounting element made in a single piece, in the shape of a U and comprising a first branch and a second branch connected by a web located against the edge of the panel, the web having a rectilinear profile and extending substantially parallel to a screwing axis, the first branch being connected to the web by a first bend and the second branch being connected to the web by a second bend, the first branch comprising a proximal portion extending from the first bend and an adjacent distal portion extending from the proximal portion thereof, the second branch comprising a proximal portion extending from the second bend and an adjacent distal portion extending from the proximal portion thereof, a screwing element supported by the distal portion of the first branch, a bore extending inside the screwing element along the screwing axis and emerging inside the mounting element through the distal portion of the first branch and an opening passing through the distal portion of the second branch opposite the bore,
wherein the nut is mounted on the edge of the panel such that the mounting element overlaps the edge and the screwing element is across from the hole, the web contacting the edge of the panel for locating the mounting element on the panel,
wherein the proximal portion of the first branch of the mounting element forms a reserve extension adapted to be deformed in use, allowing movement of the distal portions of the first and second branches along the screwing axis relative to each other and into a parallel position relative to each other at any of a plurality of different spacings therebetween, and
wherein the web is substantially perpendicular to the distal portions of the first and second branches when the branches are at any one of the plurality of different spacings.

* * * * *